United States Patent
Zhang

(10) Patent No.: US 11,418,443 B2
(45) Date of Patent: *Aug. 16, 2022

(54) METHOD FOR DISTRIBUTING TRANSMISSION PATH INFORMATION AND ROUTING BRIDGES

(71) Applicant: Huawei Technologies Co., Ltd., Shenzhen (CN)

(72) Inventor: Mingui Zhang, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/018,867

(22) Filed: Sep. 11, 2020

(65) Prior Publication Data

US 2020/0412648 A1 Dec. 31, 2020

Related U.S. Application Data

(63) Continuation of application No. 15/918,128, filed on Mar. 12, 2018, now Pat. No. 10,791,049, which is a
(Continued)

(30) Foreign Application Priority Data

Jun. 8, 2012 (CN) .......................... 201210188597.8

(51) Int. Cl.
*H04L 45/02* (2022.01)
*H04L 45/44* (2022.01)
(Continued)

(52) U.S. Cl.
CPC .............. *H04L 45/74* (2013.01); *H04L 45/02* (2013.01); *H04L 45/44* (2013.01); *H04L 45/66* (2013.01); *H04L 49/25* (2013.01)

(58) Field of Classification Search
CPC .. G06F 11/3006; G06F 11/3055; H04L 45/00; H04L 45/02; H04L 45/44; H04L 45/66; H04L 45/74; H04L 45/586
(Continued)

(56) References Cited

U.S. PATENT DOCUMENTS 7,227,838 B1 * 6/2007 O'Riordan .............. H04L 45/00
370/217
8,331,360 B1 12/2012 Ashwood-Smith et al.
(Continued)

FOREIGN PATENT DOCUMENTS

CN 1848794 A 10/2006
CN 101466126 A 6/2009
(Continued)

OTHER PUBLICATIONS

Routing Bridges (RBridges): Base Protocol Specification, Request for Comments: 6325, IETF (Year: 2011).*
(Continued)

*Primary Examiner* — Harun Chowdhury
(74) *Attorney, Agent, or Firm* — Leydig, Voit & Mayer, Ltd.

(57) ABSTRACT

A method for distributing transmission path information, including: distributing, by a first routing bridge which stores a MAC address of a host on a local link, transmission path information of the host on the local link to a remote routing bridge of a non-local link, the transmission path information including the MAC address of the host on the local link and identification information of a second routing bridge, so that the remote routing bridge learns the transmission path information from the first routing bridge. The present application further provides corresponding routing bridges. The present application may enable the remote routing bridge to timely learn the transmission path information of the host
(Continued)

--- a first routing bridge which stores an MAC address of a host on a local link acquires first information, wherein the first information is used for expressing that a second routing bridge of the local link substitutes the first routing bridge to serve as an appointed forwarding routing bridge of the local link, and the first information includes identification information of the second routing bridge ⟵ 201 after the first routing bridge acquires the first information, the first routing bridge distributes transmission path information of the host on the local link to a remote routing bridge of a non-local link, wherein the transmission path information includes the MAC address of the host on the local link and the identification information of the second routing bridge, so that the remote routing bridge learns the transmission path information from the first routing bridge ⟵ 202 under the condition that a data packet sent by the host is not received, so as to send data to the host according to a new transmission path.

19 Claims, 2 Drawing Sheets

Related U.S. Application Data continuation of application No. 14/563,443, filed on Dec. 8, 2014, now Pat. No. 9,960,996, which is a continuation of application No. PCT/CN2013/073518, filed on Mar. 30, 2013.

(51) Int. Cl.
*H04L 45/74* (2022.01)
*H04L 45/00* (2022.01)
*H04L 49/25* (2022.01)

(58) Field of Classification Search
USPC .............................. 370/217, 219, 225, 402
See application file for complete search history.

(56) References Cited

U.S. PATENT DOCUMENTS

| | | | |
|---|---|---|---|
| 8,724,456 B1* | 5/2014 | Hong | G06F 11/3055 370/225 |
| 8,780,699 B1* | 7/2014 | Hasan | H04L 45/02 370/219 |
| 2010/0128603 A1 | 5/2010 | Kulkarni et al. | |
| 2010/0296394 A1 | 11/2010 | Krzanowski | |
| 2012/0140995 A1 | 6/2012 | Kawamura et al. | |
| 2012/0236859 A1 | 9/2012 | Subramanian et al. | |
| 2012/0263035 A1 | 10/2012 | Nakanishi et al. | |
| 2012/0314715 A1* | 12/2012 | Janardhanan | H04L 45/586 370/402 |
| 2012/0320739 A1 | 12/2012 | Kamath et al. | |
| 2013/0003739 A1 | 1/2013 | Raman et al. | |
| 2014/0198808 A1 | 7/2014 | Zhou | |

FOREIGN PATENT DOCUMENTS

| | | |
|---|---|---|
| CN | 101641915 A | 2/2010 |
| CN | 102075446 A | 5/2011 |
| CN | 102244614 A | 11/2011 |
| CN | 102291320 A | 12/2011 |
| CN | 102394819 A | 3/2012 |
| CN | 102404181 A | 4/2012 |
| CN | 102439581 A | 5/2012 |
| CN | 102724120 A | 10/2012 |
| EP | 1713235 B1 | 4/2008 |
| EP | 2600573 A1 | 6/2013 |
| KR | 100748694 B1 | 8/2007 |

OTHER PUBLICATIONS

Perlman et al., "Routing Bridges (RBridges): Base Protocol Specification," Internet Engineering Task Force (IETF), Request for Comments: 6325, Category: Standards Track, ISSN: 2070-1721, XP015076094, IETF, Reston, Virginia (Jul. 2011).

Scott et al., "Addressing the Scalability of Ethernet with MOOSE; draft-malc-armd-moose-00.txt," Internet Engineering Task Force Internet-Draft Intended status: Informational, XP015071859, IETF Trust, Reston, Virginia (Oct. 18, 2010).

Zhang et al., "To Address the Space Limitation of Inner VLAN; draft-zhang-tri11-vlan-extension-01.txt," Internet-Draft Intended Status: Informational, XP015076777, IEFT (Jun. 28, 2011).

Komiya et al., "Leading edge course for network(Second Installment) TRILL, Protocol for realizing multipath by Layer 2," Datacenter Technologies Department, Crocade Communications Systems Inc. (2012).

Tamura, "Changing Data Center Networks—New Technology "Ethernet Fabric"—Part 2—Encapsulation of Ethernet~Frames~TRILL and SPB are the Bases," Nikkei NETWORK, Nikkei BP, No. 146, (2012).

Eastlake, "RFC 6326, Transparent Interconnection of Lots of Links (TRILL) Use of IS-IS," Jul. 2011, IETF (Year: 2011).

Perlman, "RFC 6439, Routing Bridges (RBridges): Appointed Forwarders," Nov. 2011, IETF (Year: 2011).

* cited by examiner

METHOD FOR DISTRIBUTING TRANSMISSION PATH INFORMATION AND ROUTING BRIDGES

CROSS-REFERENCE TO RELATED APPLICATIONS

This application is a continuation of U.S. patent application Ser. No. 15/918,128, filed on Mar. 12, 2018, which is a continuation of U.S. patent application Ser. No. 14/563,443, filed on Dec. 8, 2014, now U.S. Pat. No. 9,960,996. The U.S. patent application Ser. No. 14/563,443 is a continuation of International Patent Application No. PCT/CN2013/073518, filed on Mar. 30, 2013, which claims priority to Chinese Patent Application No. 201210188597.8, filed on Jun. 8, 2012. All of the aforementioned patent applications are hereby incorporated by reference in their entireties.

TECHNICAL FIELD

The present application relates to communication technologies, and particularly to a method for distributing transmission path information and routing bridges.

BACKGROUND

At present, in an Ethernet based on a transparent Interconnection of lots of links (TRILL) protocol, a remote routing bridge mainly learns transmission path information of a target host from a received data packet in an address learning manner of a data layer during data forwarding, the transmission path information includes a media access control (MAC) address of the target host and an address of a routing bridge for forwarding the information of the target host, and then information is sent to the target host according to the learnt transmission path information. In practical application, the inventor discovers that such a learning manner has problems. For example, when the target host is migrated or the routing bridge for forwarding the information of the target host is changed, namely when a transmission path of the target host for transceiving information is changed, if the remote routing bridge does not timely receive the data packet sent by the target host after the transmission path is changed and does not timely acquire new path information of the target host, the remote routing bridge would send data to the target host according to the original path information, which will lead to losing of the data packet forwarded to a migration point.

In the TRILL protocol applied to the Ethernet, when the routing bridge is no longer used as an appointed forwarding routing bridge of a local link, the original transmission path information stored by the routing bridge and learnt from the routing bridge by an MAC host of hosts connected to the local link and the remote routing bridge is cleared through sending a link state protocol data unit (LSP). In practical application, if the remote routing bridge clears the original transmission path information of the host and does not timely learn new transmission path information because a data packet sent by a new appointed forwarding routing bridge is not received, the remote routing bridge would send a data packet according to unknown unicast, thus causing waste of network bandwidths.

SUMMARY

Embodiments of the present application provide a method for distributing transmission path information and corresponding routing bridges.

According to an aspect of the embodiments of the present application, a method for distributing transmission path information, includes:

acquiring, by a first routing bridge which stores a media access control MAC address of a host on a local link, first information, the first information being used for expressing that a second routing bridge of the local link substitutes the first routing bridge to serve as an appointed forwarding routing bridge of the local link, and the first information including identification information of the second routing bridge;

after the first routing bridge acquires the first information, distributing, by the first routing bridge, transmission path information of the host on the local link to a remote routing bridge of a non-local link, the transmission path information including the MAC address of the host on the local link and the identification information of the second routing bridge, so that the remote routing bridge learns the transmission path information from the first routing bridge.

Optionally, the acquiring, by a first routing bridge, first information specifically includes: acquiring, by the first routing bridge, the first information sent by an appointed routing bridge of the local link, the appointed routing bridge being used for appointing a routing bridge of the local link as an appointed forwarding routing bridge of the local link.

Optionally, the first information is a Hello message.

Optionally, when the local link is accessed to the first routing bridge in a link aggregation manner and the second routing bridge in a link aggregation manner, the first routing bridge is an active routing bridge of the local link; and the first information is also used for expressing that the second routing bridge is used as an active routing bridge of the local link.

Optionally, the acquiring, by a first routing bridge, first information includes: acquiring, by the first routing bridge, the first information from a link aggregation control protocol data unit LACPDU sent by a local switch.

Optionally, the distributing, by the first routing bridge, transmission path information to a remote routing bridge of a non-local link includes: distributing, by the first routing bridge, the transmission path information to the remote routing bridge based on an end system address distribution information ESADI protocol.

According to another aspect of the embodiments of the present application, a routing bridge, serving as an appointed forwarding routing bridge of a host on a local link, the first routing bridge includes:

a storage unit, configured to store a media access control MAC address of a host on the local link;

an acquiring unit, configured to acquire first information, the first information being used for expressing that a routing bridge of the local link substitutes the first routing bridge to serve as an appointed forwarding routing bridge of the local link, and the first information including identification information of the second routing bridge;

a distributing unit, configured to, after the acquiring unit acquires the first information, distribute transmission path information of the host on the local link to a remote routing bridge of a non-local link, the transmission path information including the MAC address of the host on the local link and the identification information of the second routing bridge, so that the remote routing bridge learns the transmission path information from the first routing bridge.

Optionally, the acquiring unit is further configured to acquire the first information sent by an appointed routing bridge of the local link, wherein the appointed routing bridge is used for appointing a routing bridge of the local link as an appointed forwarding routing bridge of the local link.

Optionally, the first information is a Hello message.

Optionally, the first routing bridge further includes an access unit, the access unit is configured to access the local link in a link aggregation manner, the acquiring unit is configured to acquire the first information, and the first information is also used for expressing that the second routing bridge is used as an active routing bridge of the local link.

Optionally, the acquiring unit is further configured to acquire the first information from a link aggregation control protocol data unit LACPDU sent by a local switch.

Optionally, the distributing unit is further configured to distribute the transmission path information to the remote routing bridge, based on an end system address distribution information ESADI protocol.

According to a further aspect of the embodiments of the present application, a remote routing bridge, includes:

a learning unit, configured to learn transmission path information of a host on a local link, notified by a first routing bridge which stores an MAC address of the host on the local link, the transmission path information including the MAC address of the host on the local link and an address of a second routing bridge of the local link, and the second routing bridge substituting the first routing bridge to serve as an appointed forwarding routing bridge of the local link;

a sending unit, configured to send information to the host of the local link according to the transmission path information learnt by the learning unit.

Optionally, the learning unit is further configured to learn the transmission path information of the host on the local link, notified by the first routing bridge of the local link based on an end system address distribution information ESADI protocol.

According to the embodiments of the present application, the routing bridge on the local link notifies the remote routing bridge of the transmission path information of the host on the local link, so that the remote routing bridge can timely learn the transmission path information of the host on the local link and thus send information to the host on the local link according to the learnt transmission path information, the condition that the remote routing bridge may only send a data packet according to unknown unicast when the transmission path information stored by the remote routing bridge is cleared is avoided, and data losing caused in the condition that the remote routing bridge sends the data according to the original path is avoided.

DETAILED DESCRIPTION OF THE EMBODIMENTS

Figures 1, 2:
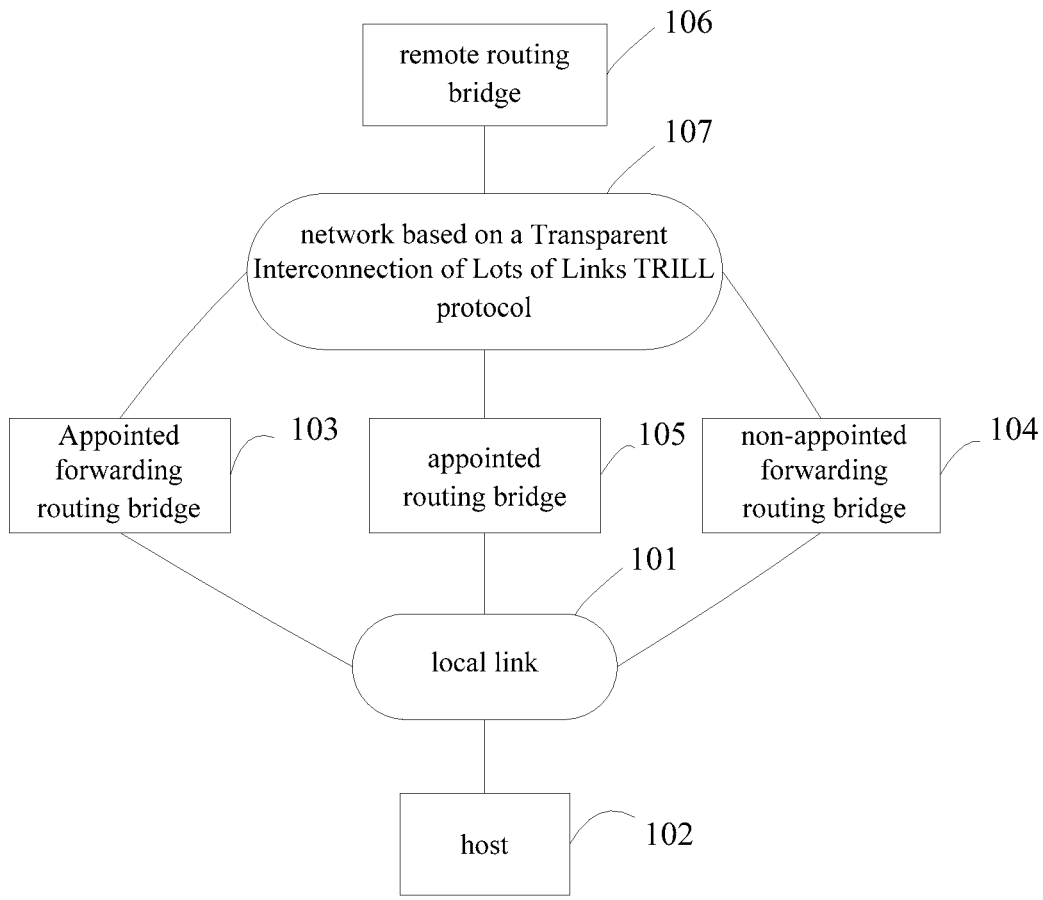
FIG. 1 is a structural schematic diagram of a network using a method of an embodiment of the present application.
FIG. 2 is a flow schematic diagram of a method for distributing transmission path information in an embodiment of the present application.

As shown in FIG. 1, a network system includes a local link 101, a host 102 on the local link, an appointed forwarding routing bridge 103 of the local link, a non-appointed forwarding routing bridge 104 of the local link and an appointed routing bridge 105 of the local link. The appointed forwarding routing bridge 103, the non-appointed forwarding routing bridge 104 and the appointed routing bridge 105 intercommunicate with a remote routing bridge 106 of a non-local link through a network 107 based on a TRILL protocol. The host on the local link 101 may send a data packet to the remote routing bridge 106 through the appointed forwarding routing bridge 103 of the local link. Moreover, the remote routing bridge 106 may also send a data packet to the host 102 through the appointed forwarding routing bridge 103.

The following will introduce a method for distributing transmission path information in an embodiment of the present application, which may be applied to the above-mentioned network.

As shown in FIG. 2, a method for distributing transmission path information, includes:

201, a first routing bridge which stores an MAC address of a host on a local link acquires first information, wherein the first information is used for expressing that a second routing bridge of the local link substitutes the first routing bridge to serve as an appointed forwarding routing bridge of the local link, and the first information includes identification information of the second routing bridge.

In 201, before receiving the first information, the first routing bridge is the appointed forwarding routing bridge of the local link. The identification information of the second routing bridge may be expressed by the address of the second routing bridge. Other routing bridge or other host may send data to the second routing bridge according to the identification information of the second routing bridge.

202, after the first routing bridge acquires the first information, the first routing bridge notifies a remote routing bridge of a non-local link of transmission path information of the host on the local link, wherein the transmission path information includes the MAC address of the host on the local link and the identification information of the second routing bridge, so that the remote routing bridge learns the transmission path information from the first routing bridge.

For example, when the host on the local link is migrated, the appointed forwarding routing bridge for forwarding the data of the host is changed, the appointed forwarding routing bridge for forwarding the data of the host before migration is equivalent to the first routing bridge, and the appointed forwarding routing bridge for forwarding the data of the host after migration is equivalent to the second routing bridge. After acquiring the identification information of the appointed forwarding routing bridge (e.g. the second routing bridge) for forwarding the data of the host after migration, the appointed forwarding routing bridge (e.g. the first routing bridge) for forwarding the data of the host before migration notifies the remote routing bridge of the MAC address of the host and the identification information of the appointed forwarding routing bridge (e.g. the second routing bridge) for forwarding the data of the host after migration, so that the remote routing bridge learns the identification information of the appointed forwarding routing bridge (e.g. the second routing bridge) for forwarding the data of the host after migration and the MAC address of the host from the appointed forwarding routing bridge (e.g. the first routing bridge) for forwarding the data of the host before migration, namely learns new transmission path information of the host. After acquiring the new transmission path information of the host, the remote routing bridge may acquire a transmission path according to the new transmission path information, so as to send the data sent to the host to the appointed forwarding routing bridge (e.g. the second routing bridge) for forwarding the data of the host after migration, and then the second routing bridge forwards the data to the host. Accordingly, the remote routing bridge may also acquire the new transmission path information of the host without waiting for the data packet sent by the migrated host.

Optionally, the first routing bridge is the appointed forwarding routing bridge before the host of the local link is migrated.

The local link may be accessed to a plurality of routing bridges, the first routing bridge is the appointed forwarding routing bridge before the host of the local link is migrated, and the MAC address of the host on the local link is stored in an MAC address table of the first routing bridge. After the first routing bridge acquires the first information, the first routing bridge is no longer used as the appointed forwarding routing bridge of the local link, and the first routing bridge notifies the remote routing bridge of the transmission path information of the host on the local link, so that the remote routing bridge learns the transmission path information. When the appointed forwarding routing bridge of the local link is switched from the first routing bridge to the second routing bridge, the remote routing bridge may send data to the second routing bridge according to the learnt identification information of the second routing bridge, and the second routing bridge forwards the data to the host on the local link.

Optionally, the first routing bridge acquires the first information, appointcally, the first routing bridge acquires the first information sent by an appointed routing bridge of the local link, wherein the appointed routing bridge is used for appointing a routing bridge of the local link as the appointed forwarding routing bridge of the local link.

Optionally, the first information is a Hello message, and the Hello message is used for expressing that the second routing bridge substitutes the first routing bridge to serve as the appointed forwarding routing bridge of the local link.

Since the appointed forwarding routing bridge is appointed by the appointed routing bridge, when the appointed routing bridge appoints the second routing bridge to substitute the first routing bridge to serve as the appointed forwarding routing bridge of the local link, the appointed routing bridge sends a message to the first routing bridge, such as the Hello message, and the message is used for expressing that the second routing bridge substitutes the first routing bridge to serve as the appointed forwarding routing bridge of the local link. After acquiring the message, the first routing bridge notifies the remote routing bridge of the transmission path information of the host on the local link, so that the remote routing bridge learns the transmission path information from the first routing bridge. What's more, the first routing bridge is no longer used as the appointed forwarding routing bridge of the local link, whereas the second routing bridge is used as a new appointed forwarding routing bridge. After switching is completed, the remote routing bridge may send data to the host on the local link through the second routing bridge according to the learnt transmission path information, thus avoiding a phenomenon that a data packet is sent in an unknown unicast manner because the remote routing bridge does not receive the data packet sent by the second routing bridge and does not learn the transmission path information of the host.

Optionally, when the local link is accessed to the first routing bridge in a link aggregation manner and the second routing bridge in a link aggregation manner, the first routing bridge is an active routing bridge of the local link; and the first information is also used for expressing that the second routing bridge is used as an active routing bridge of the local link.

When the local link is accessed to a plurality of routing bridges in a link aggregation manner, the plurality of routing bridges may be all used as appointed forwarding routing bridges of a local aggregated link. However, at any specified moment, only one link serving as the local link of aggregated links is an active link, and the routing bridge connected with the active link is an active routing bridge. Of course, the active routing bridge is also the appointed forwarding routing bridge of the local link. The active routing bridge would learn and store the MAC address of the local link in a data transceiving process. It is supposed that the first routing bridge is used as the active routing bridge, and after the first information is acquired, the first routing bridge would distribute the transmission path information of the local link to the remote routing bridge. After the active routing bridge of the local link is switched from the first routing bridge to the second routing bridge, the remote routing bridge may forward the data to the host on the local link through the second routing bridge according to the learnt transmission path information.

Optionally, the first routing bridge acquires the first information, specifically, the first routing bridge acquires the first information from a link aggregation control protocol data unit (LACPDU) sent by a local switch.

The local aggregated link is based on a link aggregation control protocol (LACP) in IEEE 802.3ad standards, and LACP is a protocol for realizing dynamic aggregation of links. The local aggregated link based on the LACP protocol exchanges information with an opposite end through the LACPDU. The first routing bridge may determine the active routing bridge of the next moment by interacting with the LACPDU of the local link and acquire the identification information of the active routing bridge of the next moment, for expressing an address, so as to distribute the new transmission path information of the host of the local link to the remote routing bridge.

Optionally, the first routing bridge notifies the remote routing bridge of the non-local link of the transmission path information of the host on the local link, specifically, the first routing bridge notifies the remote routing bridge of the transmission path information based on an end system address distribution information (ESADI) protocol.

In the network based on the TRILL protocol, the ESADI protocol defined by the TRILL protocol may enable the appointed forwarding routing bridge (e.g. the first routing bridge) before migration to distribute the learnt MAC address of the host and the identification information of the appointed forwarding routing bridge (e.g. the second routing bridge) after migration to the remote routing bridge, through a control layer. The appointed forwarding routing bridges and the remote routing bridge herein belong to a same virtual local area network (VLAN).

Figure 3:
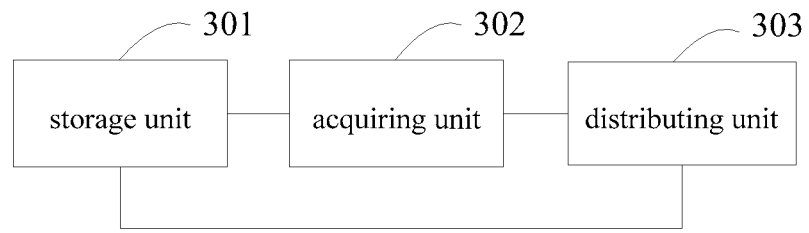
FIG. 3 is a structural schematic diagram of a first routing bridge of an embodiment of the present application.

As shown in FIG. 3, a first routing bridge as mentioned in embodiment 1 includes a storage unit 301, an acquiring unit 302 and a distributing unit 303. The storage unit 301 is configured to store an MAC address of a host on a local link, and may be a memory or other cache equipment. Specifically, the storage unit 301 may be implemented by an RAM (Random Access Memory), an FPGA (Field-Programmable Gate Array and the like. The acquiring unit 302 is configured to acquire first information. The first information is used for expressing that a second routing bridge substitutes the first routing bridge to serve as an appointed forwarding routing bridge of the local link. The first information includes identification information of the second routing bridge. The distributing unit 303 is configured to, after the acquiring unit 302 acquires the first information, distribute transmission path information of the host on the local link to a remote routing bridge of a non-local link. The transmission path information includes the MAC address of the host on the local link and the identification information of the second routing bridge, so that the remote routing bridge learns the transmission path information from the first routing bridge. The distributing unit 303 may be a transmitter.

The appointed forwarding routing bridge serving as a forwarder of the local link would learn the MAC address of the host in the process of forwarding data transceived by the host of the local link and store the MAC address of the host in an MAC address table of the storage unit 301. After the acquiring unit 302 acquires the first information, the distributing unit 303 distributes the transmission path information of the host on the local link to the remote routing bridge, so that the remote routing bridge learns the transmission path information.

Optionally, the acquiring unit 302 is further configured to acquire the first information sent by an appointed routing bridge of the local link. The appointed routing bridge is used for appointing a routing bridge of the local link as the appointed forwarding routing bridge of the local link.

Optionally, the acquiring unit is further configured to acquire the first information sent by an appointed routing bridge of the local link, the first information is a Hello message, and the Hello message is used for expressing that the second routing bridge substitutes the first routing bridge to serve as the appointed forwarding routing bridge of the local link.

Optionally, the distributing unit 303 is further configured to distribute the transmission path information to the remote routing bridge of the non-local link, based on an end system address distribution information ESADI protocol. In a network based on a TRILL protocol, the ESADI protocol defined by the TRILL protocol may enable the routing bridge to distribute the learnt MAC address of the host and the identification information of the routing bridge to the remote routing bridge, through a control layer.

Figure 4:
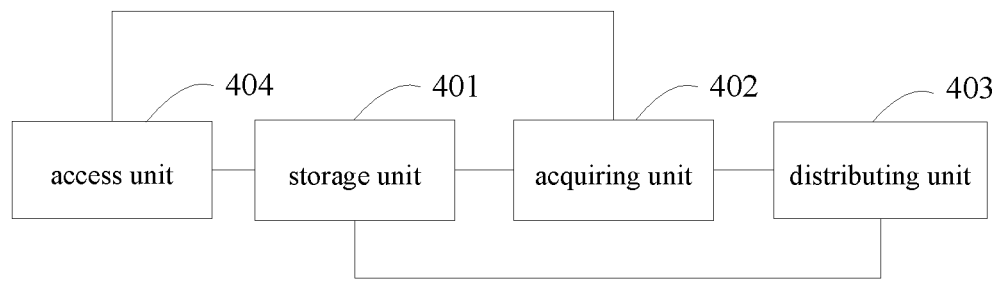
FIG. 4 is a structural schematic diagram of another first routing bridge of an embodiment of the present application.

As shown in FIG. 4, a first routing bridge includes a storage unit 401, an acquiring unit 402 and a distributing unit 403. The storage unit 401 is configured to store an MAC address of a host on a local link, and may be a memory or other cache equipment. Specifically, the storage unit 401 may be implemented by an RAM (Random Access Memory), an FPGA (Field-Programmable Gate Array) and the like. The acquiring unit 402 is configured to acquire first information. The first information is used for expressing that a second routing bridge of the local link substitutes the first routing bridge to serve as an appointed forwarding routing bridge of the local link. The first information includes identification information of the second routing bridge. The distributing unit 403 is configured to, after the acquiring unit 402 acquires the first information, distribute transmission path information of the host on the local link to a remote routing bridge of a non-local link. The transmission path information includes the MAC address of the host on the local link and the identification information of the second routing bridge, so that the remote routing bridge learns the transmission path information from the first routing bridge. The distributing unit 403 may be a transmitter.

Optionally, the first routing bridge further includes an access unit 404, and the access unit 404 is configured to connect the host of the local link accessed to the routing bridge in a link aggregation manner.

Optionally, the acquiring unit 402 is configured to acquire the first information, and the first information is also used for expressing that the second routing bridge is used as an active routing bridge of the local link. In an aggregated link, the data of the host are sent to the remote routing bridge through the active routing bridge.

Optionally, the acquiring unit 402 is configured to acquire the first information from an LACPDU sent by a local switch of the local link. In an aggregated link, based on a link aggregation control protocol, the first routing bridge may acquire the first information from the LACPDU sent by the local switch by information exchange with the local link, to learn that the second routing bridge would substitute the first routing bridge to serve as an active routing bridge of the local link.

Optionally, the distributing unit 403 is further configured to distribute the transmission path information to the remote routing bridge, based on an end system address distribution information ESADI protocol.

Figure 5:
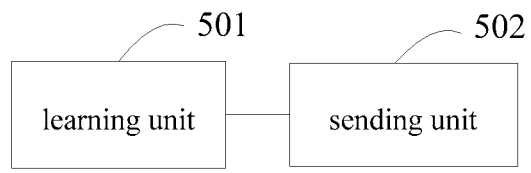
FIG. 5 is a structural schematic diagram of a remote routing bridge of an embodiment of the present application.

As shown in FIG. 5, a remote routing bridge includes a learning unit 501 and a sending unit 502, wherein the learning unit 501 is configured to learn transmission path information of a host on a local link, notified by a first routing bridge which stores an MAC address of the host on the local link, the transmission path information includes the MAC address of the host on the local link and an address of a second routing bridge of the local link, and the second routing bridge substitutes the first routing bridge to serve as an appointed forwarding routing bridge of the local link. The sending unit 502 is configured to send information to the host of the local link according to the transmission path information learnt by the learning unit 501.

The learning unit 501 is further configured to receive the transmission path information of the host on the local link, notified by the first routing bridge of the local link based on an end system address distribution information ESADI protocol.

The remote routing bridge of the non-local link acquires a transmission path according to the transmission path information notified by the first routing bridge of the local link and learnt by the learning unit 501, and sends information to the host through the sending unit 502 without receiving and extracting a data packet sent by the host to acquire the transmission path.

The method for distributing the transmission path information and the routing bridges provided by the embodiments of the present application are introduced in detail above; the principles and embodiments of the present application are illustrated by using specific examples in the context, and the illustration of the above embodiments is merely used for assisting in understanding the system of the present application and the core thought thereof; and meanwhile, changes are made to the specific embodiments and the application range for those skilled in the art according to the thought of the present application. In conclusion, the contents of this specification should not be appreciated as limit to the present application.

What is claimed is:
1. A method comprising:
receiving, by a remote device in a first non-local link, information from a first device of a local link,
wherein the remote device in the first non-local link and the first device in the local link communicate through a network, wherein the information comprises a media access control (MAC) address of a host and identification information of a second device in the local link,
wherein the information notifies the remote device of a second non-local link of transmission path information of the host of the local link after the host migrates to the second device,
wherein the first device is used to forward data from the host to the remote device before the host migrates from the first device to the second device, and
wherein the second device is used to transmit data from the host to the remote device after the host migrates from the first device to the second device; and
transmitting, by the remote device and according to the second non-local link, data to the second device for forwarding the data to the host.

2. The method of claim 1, wherein the host is accessed to the first device and the second device, respectively, in a link aggregation manner.

3. The method of claim 2, wherein the information is obtained by the first device from a link aggregation control protocol data unit (LACPDU).

4. The method of claim 2, wherein the identification information of the second device is obtained from a link aggregation control protocol data unit (LACPDU).

5. The method of claim 1, wherein the remote device receives the information based on an end system address distribution information (ESADI) protocol.

6. The method of claim 1, wherein the remote device, the first device and the second device are in a same virtual local area network (VLAN).

7. The method of claim 1, wherein the information is a Hello message.

8. A remote device, in a first non-local link, comprising a processor and a non-transitory processor-readable storage medium having processor-executable instructions stored thereon, wherein the instructions, when executed by the processor, cause the remote device to:
receive information from a first device of a local link,
wherein the remote device in the first non-local link and the first device in the local link communicate through a network,
wherein the information comprises a media access control (MAC) address of a host and identification information of a second device in the local link,
wherein the information notifies the remote device of a second non-local link of transmission path information of the host of the local link after the host migrates to the second device,
wherein the first device is used to forward data from the host to the remote device before the host migrates from the first device to the second device, and
wherein the second device is used to transmit data from the host to the remote device after the host migrates from the first device to the second device; and
transmit, according to the second non-local link, data to the second device for forwarding the data to the host.

9. The remote device of claim 8, wherein the host is accessed to the first device and the second device, respectively, in a link aggregation manner.

10. The remote device of claim 9, wherein the information is obtained by the first device from a link aggregation control protocol data unit (LACPDU).

11. The remote device of claim 9, wherein the identification information of the second device is obtained from a link aggregation control protocol data unit (LACPDU).

12. A non-transitory computer-readable storage medium comprising instructions that, when executed by a computer of a remote device in a first non-local link, cause the computer to carry out at least the following operations:
receiving information from a first device of a local link,
wherein the remote device in the first non-local link and the first device in the local link communicate through a network,
wherein the information comprises a media access control (MAC) address of a host and identification information of a second device in the local link,
wherein the information notifies the remote device of a second non-local link of transmission path information of the host of the local link after the host migrates to the second device,
wherein the first device is used to forward data from the host to the remote device before the host migrates from the first device to the second device, and
wherein the second device is used to transmit data from the host to the remote device after the host migrates from the first device to the second device; and
transmitting, according to the second non-local link, data to the second device for forwarding the data to the host in response to the remote device receiving the information.

13. The non-transitory computer-readable storage medium of claim 12, wherein the host is accessed to the first device and the second device, respectively, in a link aggregation manner.

14. The non-transitory computer-readable storage medium of claim 13, wherein the information is obtained by the first device from a link aggregation control protocol data unit (LACPDU).

15. The non-transitory computer-readable storage medium of claim 13, wherein the identification information of the second device is obtained from a link aggregation control protocol data unit (LACPDU).

16. A network system comprising a first device of a local link, a second device of the local link and a remote device of a first non-local link,
wherein the first device is configured to forward traffic from a host of the local link to the remote device before the host migrates from the first device to the second device,
wherein the second device is configured to forward traffic from the host to the remote device after the host migrates from the first device to the second device,
wherein the remote device is configured to:
receive information from the first device and
wherein the remote device in the first non-local link and the first device in the local link communicate through a network,
wherein the information comprises a media access control (MAC) address of the host and identification information of the second device in the local link, and
wherein the information notifies the remote device of a second non-local link of transmission path information of the host after the host migrates to the second device; and
transmit, according to the second non-local link, data to the second device for forwarding the data to the host in response to the remote device receiving the information.

17. The network system of claim 16, wherein the host is accessed to the first device and the second device, respectively, in a link aggregation manner.

18. The network system of claim 17, wherein the information is obtained by the first device from a link aggregation control protocol data unit (LACPDU).

19. The network system of claim 17, wherein the identification information of the second device is obtained from a link aggregation control protocol data unit (LACPDU).

* * * * *